(12) United States Patent
Dorai et al.

(10) Patent No.: US 8,386,612 B2
(45) Date of Patent: Feb. 26, 2013

(54) OPTIMIZING MIGRATION POLICY DURING LIVE VIRTUAL MEMORY MIGRATION

(75) Inventors: Chitra Dorai, Chappaqua, NY (US); Robert Evan Strom, Ridgefield, CT (US); Sai Zeng, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 1048 days.

(21) Appl. No.: 12/368,542

(22) Filed: Feb. 10, 2009

(65) Prior Publication Data

US 2010/0205252 A1    Aug. 12, 2010

(51) Int. Cl.
G06F 15/173    (2006.01)
G06F 9/455    (2006.01)

(52) U.S. Cl. ............................... 709/226; 709/205; 718/1
(58) Field of Classification Search .......... 709/203–205, 709/220–237; 718/1, 105–106
See application file for complete search history.

(56) References Cited

U.S. PATENT DOCUMENTS

| | | | | |
|---|---|---|---|---|
| 7,673,113 | B2* | 3/2010 | Sugumar et al. | 711/170 |
| 7,761,573 | B2* | 7/2010 | Travostino et al. | 709/226 |
| 7,934,162 | B2* | 4/2011 | Wong et al. | 715/747 |
| 2010/0094948 | A1* | 4/2010 | Ganesh et al. | 709/212 |

OTHER PUBLICATIONS

Clark, C., et al., "Live Migration of Virtual Machines," in Proceedings of the 2nd ACM/USENIX Symposium on Networked Systems Design and Implementation (NSDI), 2005, pp. 273-286.

* cited by examiner

Primary Examiner — Yasin Barqadle
(74) Attorney, Agent, or Firm — Yee & Associates, P.C.; Louis Percello

(57) ABSTRACT

Controlling live migration of a running application between a source machine and a target machine is provided. At least one application characteristic and at least one network characteristic are obtained. An objective function that defines a cost to migrate from the source machine to the target machine as a function such as a weighted combination of at least one cost property is obtained. The objective function is optimized using the at least one application characteristic and the at least one network characteristic to determine a policy specifying when to switch execution of the running application from the source machine to the target machine. Live migration of the application from the source machine is controlled to send pages from the source machine to the target machine in accordance with the policy, and to switch the execution of the application from the source machine to the target machine at a state specified by the policy.

20 Claims, 6 Drawing Sheets

- Parameters: ⟋ 410
  - Link Bandwidth (bytes per second) => pages per second) ⟋ 414
    - One "decision tick" = time to send one page
  - Link Latency (ticks) ⟋ 416
  - Processing Speed (page reads/writes per tick) ⟋ 418
  - Application Parameters ⟋ 419
  - Probability Distribution (each page's probability of read/write per tick) ⟋ 412

- Objective Function ⟋ 420
  - Total cost = α migration ticks + β disruption ticks

- Decisions at each tick ⟋ 402
  - Which page to send during pre-copy ⟋ 404
  - Whether to halt pre-copy phase and begin demand-page phase ⟋ 406
  - After pre-copy, will automatically send:
    - If there is a demand page request for unsent page, then that page
    - Otherwise, the unsent page most likely to be referenced

- A policy is a rule π saying: "if in the current tick, you're in state s, take decision π(s)"
  - Here, the state is which pages are candidates to send (unsent, or sent but dirtied)

- An optimal policy is one that minimizes the expected cumulative cost over all ticks from start to finish

FIG. 4

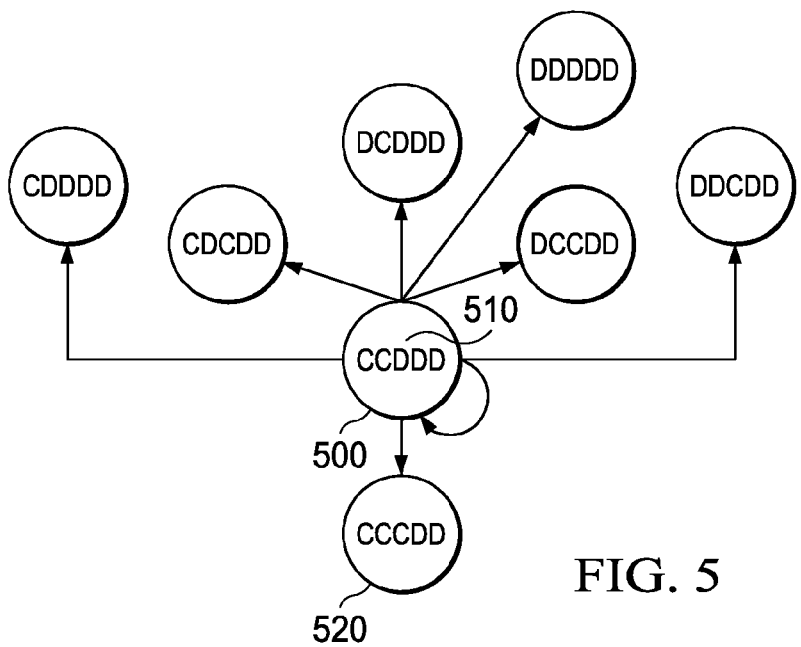

Example: Here is a pre-copy plan for the sub-problem. Low-probability pages are on the left and high on the right.
CCCCCCCCCCCCCCCCCCCCCCCCCCCCCCCCCCCCDDDDDDDDDDDDDDDDDDDD

FIG. 9B

And here, k=4 pages before stopping pre-copying, we skip over eight lower-probability pages to send higher-probability pages. This might cost less.
CCCCCCCCCCCCCCCCCCCCCCCCCCCCCCCCCCCCDDDDDDDDCCCCDDDDDDDDDDDD

FIG. 9C

This improvement may happen multiple times, e.g., this might cost even less:
CCCCCCCCCCCCCCCCCCCCCCCCCCCCCCCCCCCCDDDDDDDDCCDDDDDDDDDDCCDD

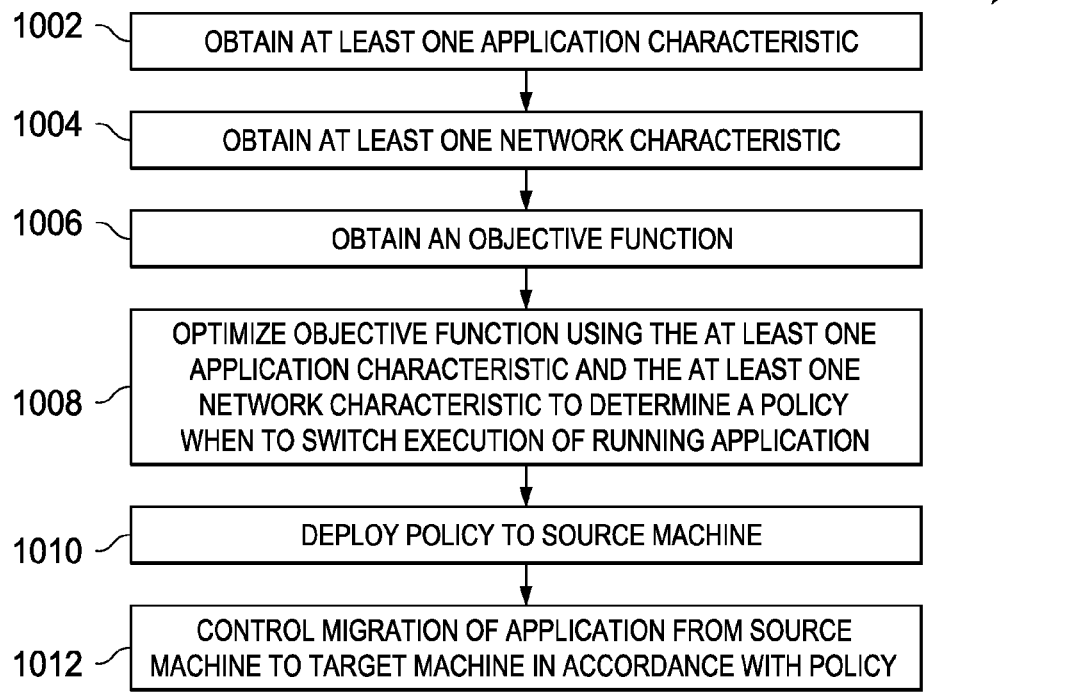

FIG. 10

OPTIMIZING MIGRATION POLICY DURING LIVE VIRTUAL MEMORY MIGRATION

BACKGROUND OF THE INVENTION

1. Field of the Invention

The present invention relates generally to the data processing field and, more specifically, to a method and system for moving an application executing on a virtual machine running on one physical machine to another virtual machine running on a different physical machine.

2. Description of the Related Art

There are a host of reasons for which the live migration of an applications running on a virtual machine is desirable. The term "migration" means that an application executing on a first virtual machine running on a first physical machine, is moved to a second virtual machine running on a different physical machine. The physical machines may be connected to one another over a local area network (LAN) or a wide-area network (WAN). The term "live migration" means that the migration is taking place while the application is running on the first virtual machine.

Live migration may be triggered, for example, by a planned or unplanned maintenance of a data center, by a consolidation, load balancing or optimization of resources in a data center, or by an external catastrophic condition. Migration may take place as a result of a human decision or due to a systems management service decision independent of the application, and should not affect the behavior of the application. The only effect of live migration should be some responsiveness delays, and even these delays should be minimized.

Migration can take place at many levels: the virtual machine, the operating system, the language runtime, or even the application. Migration at the level of the virtual machine is the most general, because the migration mechanism can be unaware of the guest operating system, of the programming language or of any other architectural feature of the application being migrated. Migration transfers the virtual memory, the external storage (disk) and network connections from a source machine to a target machine. The present application is concerned with the transfer of the virtual memory.

The most efficient known techniques for the transfer of virtual memory involve a two-phase process, a "pre-copy" phase and a "demand-paging" phase. During the pre-copy phase, selected pages are copied from the source machine to the target machine. Since the transfer must appear to occur as of a single instant of time, any pre-copied pages which have been modified (or "dirtied") after having been pre-copied and before the pre-copy phase has ended must be re-sent. After some number of pages has been pre-copied, the application is halted in the source machine, and a start message is sent to the target machine identifying which pages have been pre-copied and which pages have not yet been sent, and the demand-paging phase begins. In the demand-paging phase, the source machine continues to send the remaining pages while the application now runs on the target machine with the pages so-far sent, subject, however, to the condition that if an as-yet-unsent page is referenced, the application will take a page fault and the target machine will send a demand page request to the source machine and wait for that particular page to arrive.

It would be desirable to reduce the time required to perform the live migration process from a source machine to a target machine. In particular, it would be desirable to optimize the total migration time, i.e., the time from the beginning of the pre-copy phase until the end of the demand-paging phase; and to minimize the disruption time; i.e., the time that the application cannot run due to reasons caused by the migration—namely, when the source machine is halted and the target machine has not yet received the start message, or when the target machine is waiting due to a page fault. Total migration time is affected by both disruption time and by the prolongation of the pre-copy phase due to the need to re-send some pages. It is desirable to minimize total migration time, because during the migration, resources in both source and target machines must be reserved on behalf of the migrating application and the source machine may not yet be freed up for other purposes. It is desirable to minimize disruption time because during disruption periods the application cannot make progress, and queues of service requests build up.

BRIEF SUMMARY OF THE INVENTION

According to one embodiment of the invention, a method for controlling live migration of a running application between a source machine and a target machine includes obtaining a least one application characteristic and at least one network characteristic. An objective function that defines a cost to migrate from the source machine to the target machine as a function such as a weighted combination of at least one cost property is also obtained. An offline algorithm is executed to optimize the expected value of the objective function using the at least one application characteristic and the at least one network characteristic to determine a policy specifying which pages to send during pre-copying and when to switch execution of the running application from the source machine to the target machine. The policy is communicated to the source machine, and live migration of the application from the source machine is then controlled in accordance with this policy to send pages from the source machine to the target machine, and to switch the execution of the application from the source machine to the target machine when a state is reached that satisfies conditions specified by the policy.

BRIEF DESCRIPTION OF THE SEVERAL VIEWS OF THE DRAWINGS

FIG. 4 is a diagram that illustrates a stochastic model used to produce a policy for controlling live migration of an application from a source machine to a target machine according to an illustrative embodiment;

FIG. 5 is a diagram that schematically illustrates determination of a page sending policy for a live migration process according to an illustrative embodiment;

FIGS. 9A, 9B and 9C are diagrams that illustrate an optimal policy for the constrained subproblem and successive perturbations of this policy towards an optimal policy for the original unconstrained problem according to a further illustrative embodiment; and FIG. 10 is a flowchart that illustrates a method for controlling live migration of a running application between a source machine and a target machine according to an illustrative embodiment.

DETAILED DESCRIPTION OF THE INVENTION

Figure 1:
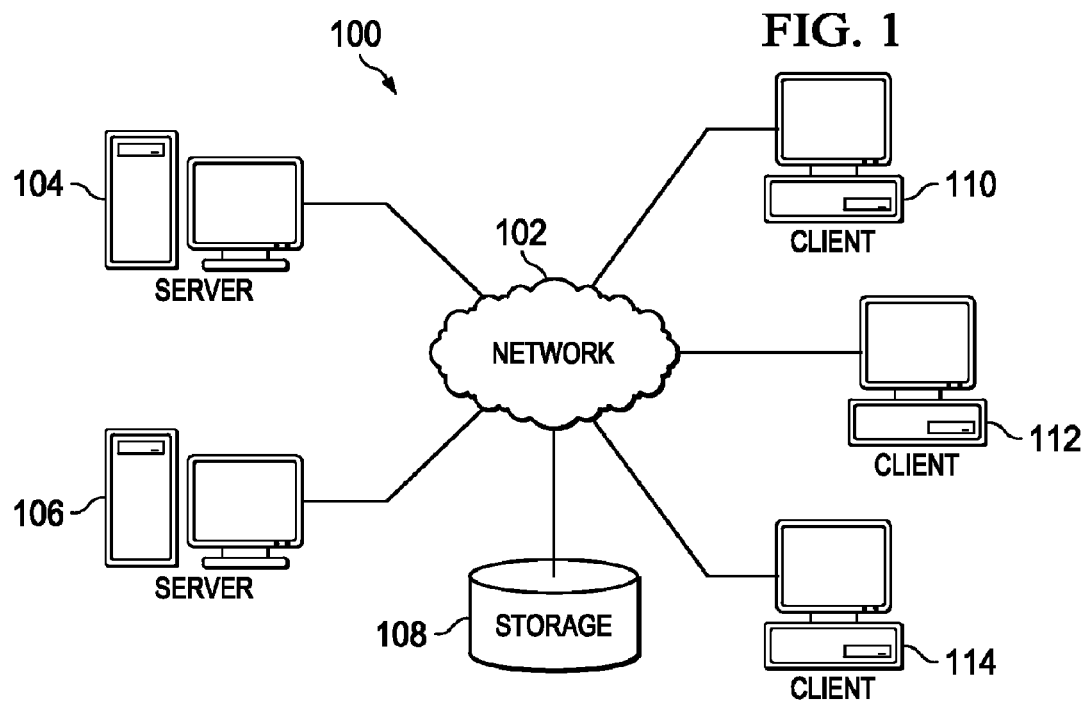
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
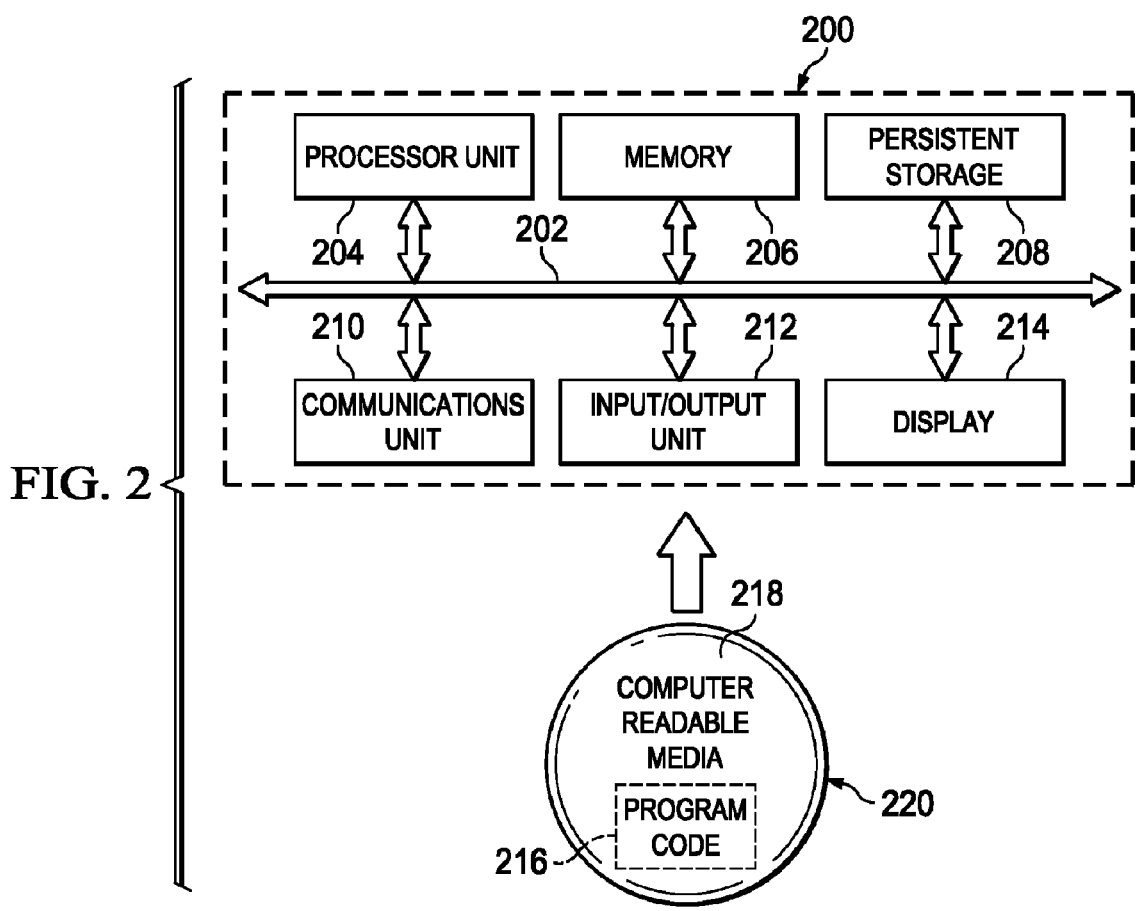
FIG. 2 a block diagram of a data processing system in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include inorganic components integrated with organic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments provide a method and system for live migration of a running application between a source machine and a target machine. At least one application characteristic and at least one network characteristic are obtained. An objective function that defines a cost to migrate from the source machine to the target machine as a function such as a weighted combination of at least one cost property is obtained. The expected value of the objective function is optimized according to a pre-computed statistical model based on the at least one application characteristic and the at least one network characteristic to determine a policy specifying which pages to send during pre-copying and when to switch execution of the running application from the source machine to the target machine. Live migration of the application from the source machine is controlled to send pages from the source machine to the target machine in accordance with the policy, and to switch the execution of the application from the source machine to the target machine at a time specified by the policy.

Figure 3:
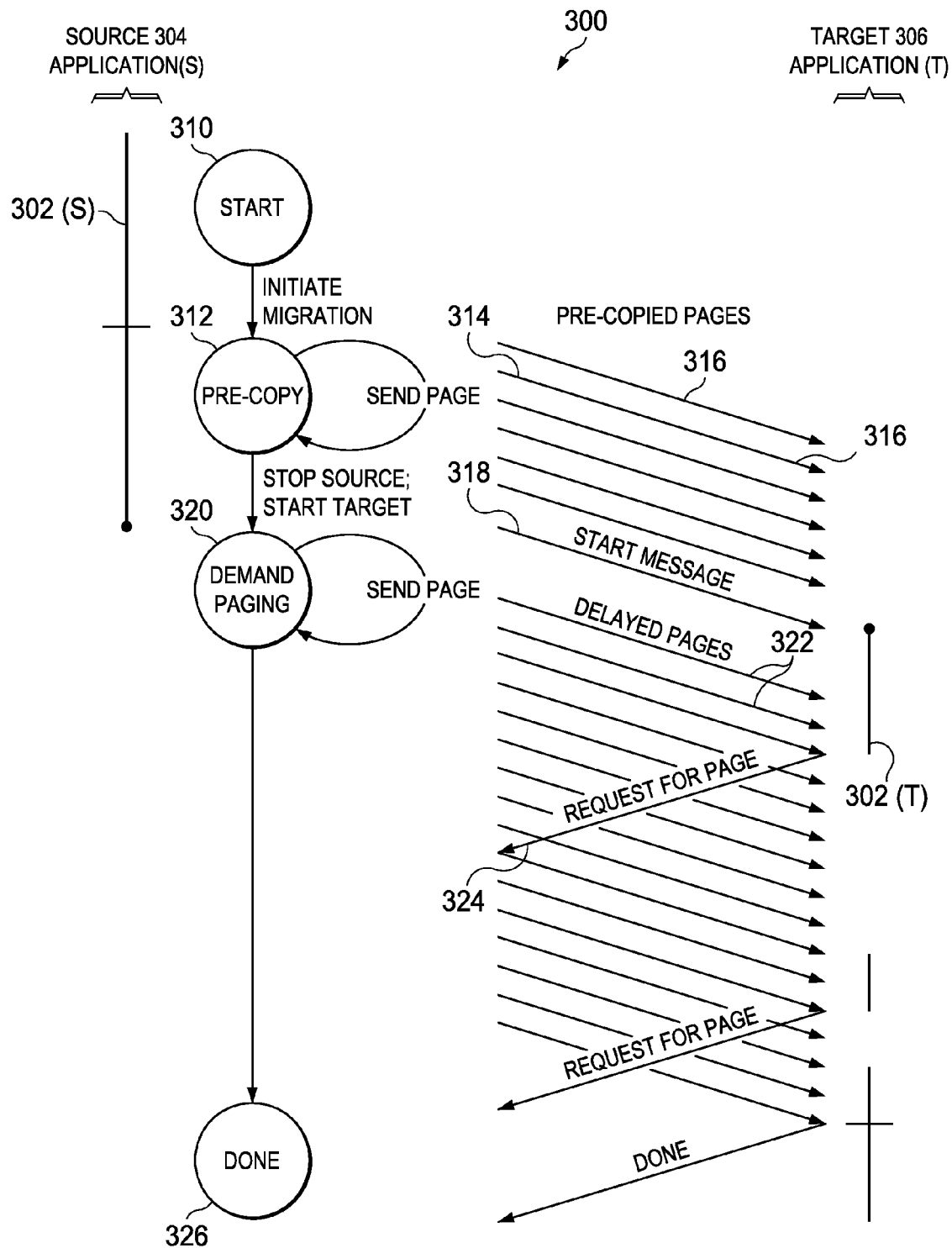
FIG. 3 is a diagram that illustrates a process for live migration of an application from a source machine to a target machine to assist in explaining illustrative embodiments.

FIG. 3 is a diagram that illustrates a process for live migration of an application from a source machine to a target machine to assist in explaining illustrative embodiments. The migration process is generally designated by reference number 300, and, in the illustrative embodiment illustrated in FIG. 3, a running application 302 is to be migrated from a source machine 304 to a target machine 306. More particularly, as shown in FIG. 3, the application executing on a virtual machine running on the source machine is designated as application 302 (S) and the application executing on a virtual machine running on the target machine is designated as application 302 (T).

The live migration process starts, as shown at 310, and enters into a pre-copy phase, designated by reference number 312. In the pre-copy phase, selected pages are copied from the source machine to the target machine as shown at 314. The pages are copied one-at-a-time as schematically illustrated at 316. After some number of pages has been pre-copied, the application 302 (S) is halted in the source machine 304, and a start message 318 is sent to the target machine 306. The start message identifies which pages have been pre-copied and which pages are not yet sent, and the demand-paging phase begins as shown at 320.

In the demand-paging phase, the source machine continues to send the remaining pages, as shown at 322, while the application now executes on a virtual machine of the target machine, application 302 (T), with the pages so-far sent. Application 302 (T), however, runs subject to the condition that if an as-yet-unsent page is referenced, the application 302 (T) will take a page fault and the target machine 306 will send a demand page request 324 to the source machine 304 and wait for that page to arrive. The demand-paging phase continues until all the pages have been copied to the target machine, at which time the live migration process is complete as shown at 326.

Illustrative embodiments are directed to a method and system for controlling the live migration of a running application between a source machine and a target machine so as to reduce the time required for the live migration. More particularly, illustrative embodiments are directed to adjusting control policies for controlling a live migration process, such as the live migration process illustrated in FIG. 3, to optimize two performance parameters of the live migration process—the total migration time, i.e., the time from the beginning of the pre-copy phase until the end of the demand-paging phase, and the disruption time, i.e., the time that the application cannot run due to reasons caused by the migration, namely, when the source machine is halted and the target machine has not yet received a start message or when the target machine is waiting due to a page fault. The control decisions that are determined by the control policies computed according to illustrative embodiments include (a) the order in which pages are selected to be sent from the source machine to the target machine during the pre-copy phase, and (b) the decision of when to switch from the pre-copy phase to the demand-paging phase.

In accordance with illustrative embodiments, the live migration process is modeled as a stochastic finite-state process in discrete time. Time is divided into discrete units called "ticks", each tick representing the length of time required to send one page from the source machine to the target machine. At each tick during the pre-copy phase, the source machine is in a particular state, distinguished by which pages are clean (clean pages are pages that have been sent to the target machine and have not been dirtied as a result of having subsequently been written) and which are not clean (dirtied pages). At each tick also, the source machine makes the decisions of (a) which page to send during the pre-copy phase, and (b) whether or not to halt the pre-copy phase and send a start message to transition to the demand-paging phase. Based on the decisions, at the beginning of the tick, one page is chosen to be "cleaned", meaning that the current state of that page is sent to the target machine. During the tick, the application runs, dirtying zero or more pages and transitioning into a new state. How many pages, if any, are dirtied, and which pages are dirtied are random events. The next state transition probability is based on a probability-of-writing which has previously been measured during a measurement phase which precedes the migration process. There is an assumption that the measured probability of writing during the measurement phase is a good approximation to the actual probabilities of writing during execution.

If the decision at a tick is to enter the demand-paging phase, at that point, the current set of "clean" pages are the sent pages, and other pages are unsent pages. During the demand-paging phase, there are no more control decisions to be made because during the demand-paging phase, the source will simply continue to send pages in decreasing order of probability of access (unless it receives a demand page request from the target machine to bump the priority of a particular page). There is an expected "cost-to-go" from each demand-paging state based upon expected number of future ticks with and without the application being blocked. The probability of blocking is computed based upon a probability that a page in the application will be accessed, which has previously been measured during a measurement phase.

The optimization problem to be solved is to find a best policy (mapping from state to decision) for traversing a state graph from an initial state of the pre-copy phase with no clean pages to a terminal state of the demand-paging phase with all pages clean, where "best" means that it minimizes the expected cost-to-go from the initial state. Since in a system with N pages, there are $2^N$ states, using straightforward dynamic programming techniques (e.g. Bellman's recurrence equation) is computationally infeasible. Instead, illustrative embodiments exploit particular properties of the problem in order to reduce the time to search for and identify an optimum policy.

In accordance with illustrative embodiments, a stochastic model is built and solved to provide a policy that is used to control the live migration process. FIG. 4 is a diagram that illustrates a stochastic model used to produce a policy for controlling live migration of an application from a source machine to a target machine according to an illustrative embodiment. The stochastic model is generally designated by reference number 400, and as shown, the source machine makes decisions 402 at every decision point (tick) during the pre-copy phase of which page to send next (decision 404), and whether to terminate the pre-copy phase and begin the demand-page phase (decision 406). This policy is computed offline prior to the migration process, and is sent to the source machine before the migration process begins and is used to control the migration process.

Before migration is started, the running application on the source machine is sampled to determine various parameters 410. These parameters include: (a) the probability of dirtying particular pages in a next tick during pre-copy, and (b) the probability of accessing particular pages during a tick during demand-pages as illustrated at 412. Additionally, network parameters (characteristics) including the bandwidth (ticks per second) 414, latency (delay to send data and demand page requests) 416 and processing speed 418 parameters are noted, as well as application parameters 419 (characteristics) such as page size, access rate of each page and write rate of each page. Also, an objective function 420 is given. This function is a weighted combination of at least one cost property and is specified by an administrator. As shown in FIG. 4, an illustrative objective function defines a total cost as $\alpha$ migration ticks +$\beta$ disruption ticks. If minimizing total migration time is more important relative to minimizing disruption, then the ratio $\alpha/\beta$ would be higher; conversely if minimizing disruption is more important, the ratio would be lower. Given these samples, stochastic model 400 is built, and solved to produce a policy 430 that determines, at every decision point (tick) during pre-copying (a) which page to send next, and (b) whether to terminate the pre-copy phase. In general, a "policy" can be defined as a rule that says "if in the current tick, you are in a state s, take decision(s)." The state is which pages are candidates to send (unsent or sent but dirtied). An "optimal policy" is a policy that minimizes the expected total (cumulative) cost over all ticks from start to finish.

As illustrated in FIG. 4, the source machine makes decisions 402 at every decision point (tick) during the pre-copy phase. The source machine must decide which page to send next during the pre-copy phase, and also, whether to terminate the pre-copy phase and begin the demand-paging phase. FIG. 5 is a diagram that schematically illustrates some of the state transitions of a finite state model for a live migration process according to an illustrative embodiment as applied to a simple application with only 5 pages, when the decision is made to remain in the pre-copy phase. Assume that we have ordered the pages in increasing order of likelihood to be written (i.e., page 1 is the least likely to be written, 2 the next least likely and so forth). So state 500 indicates a state where the 2 least likely pages have been sent and the other 3 are unsent. Assume the decision is to send page 3 of 5 pages in state 500 (page 3 is designated by reference number 510) during the pre-copy phase. As indicated by the "D" designation in FIG. 5, page 510 is dirty. To copy the page to the target machine, the page is marked as clean when it is copied. During the tick, however, the application executing on the source machine may overwrite one of the clean pages (designated by "C") including page 3 that was just sent making it dirty again. At the end of the tick, in fact, zero one or more of the clean pages may have been dirtied.

State 520 in FIG. 5 illustrates the best outcome wherein the third page 510 and all of the pages that were clean in state 500 remain clean. There are, however, many other possible states, some of which are also shown in FIG. 5. Each of the possible state results has a certain probability of occurring based upon the measured probabilities of writing.

Figure 6:
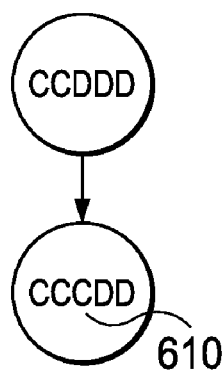
FIG. 6 is a diagram that schematically illustrates determination of a policy of when to terminate a pre-copy phase and begin a demand-paging phase of a live migration process according to an illustrative embodiment.

FIG. 6 is a diagram that schematically illustrates a state-transition when the decision is made to terminate a pre-copy phase and begin a demand-paging phase of a live migration process according to an illustrative embodiment applied to the same simplified 5-page application. As shown in FIG. 6, if the decision is to halt the pre-copy phase after sending the cleaned third page 610, the application stops executing in the source machine. Thus, at the end of the tick, no new pages can become dirty, and henceforth, pages will be sent to the target machine in an order of likeliest access first, subject to demand page requests. At the end of the tick also, there will be no further "control" decisions to be made by the source machine.

Figure 7:
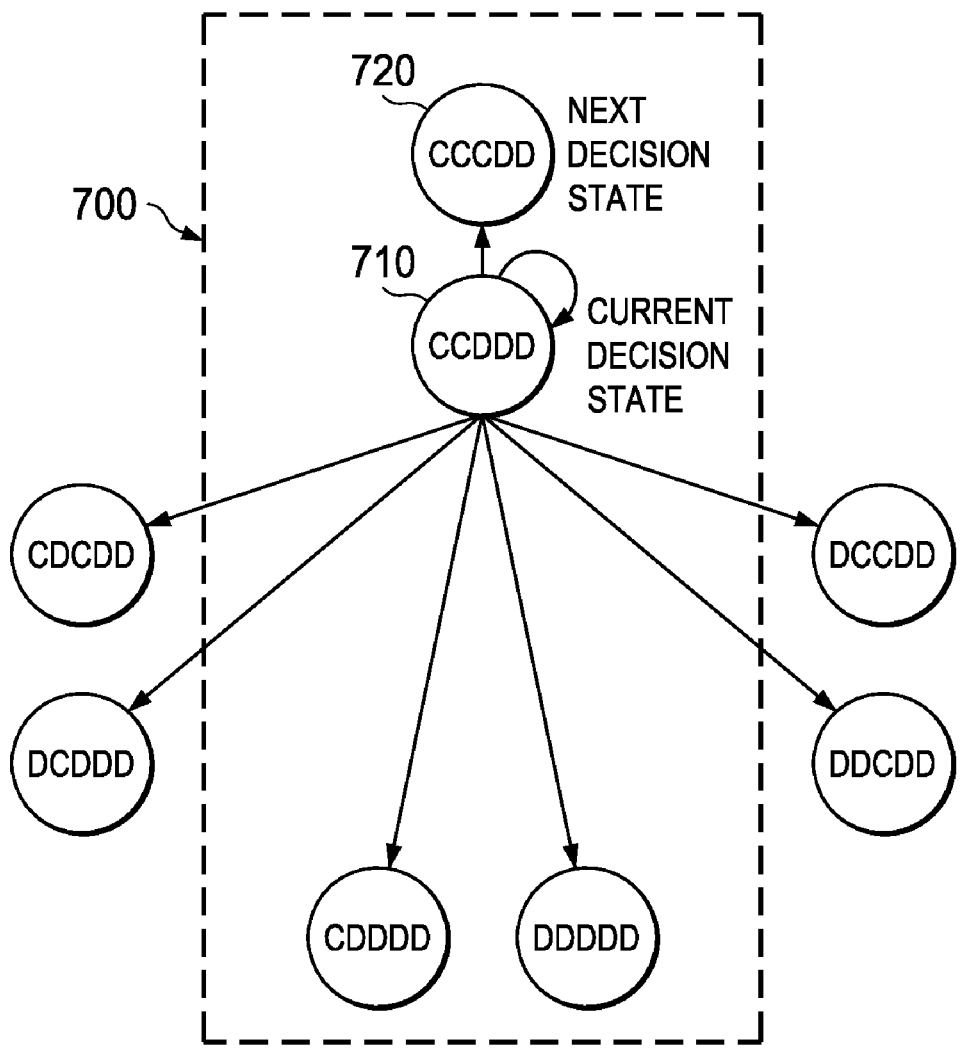
FIG. 7 is a diagram that schematically illustrates an analysis of a one-step sub-problem in the pre-copy phase of a live migration process in accordance with an illustrative embodiment.

As discussed earlier, it is computationally infeasible to apply straightforward dynamic programming techniques to find an optimal policy for applications with any significant numbers of pages, because the number of states is proportional to $2^N$ for an application with N pages. The approach disclosed here attacks the problem by first solving a constrained subproblem. FIG. 7 is a diagram that schematically illustrates the model of one step of such a constrained subproblem in the pre-copy phase of a live migration process in accordance with an illustrative embodiment. In the sub-problem, it is always chosen to clean pages in increasing order of likelihood to be written, making only a decision of when to terminate pre-copy. The problem is constrained by choosing as decision states only those illustrated in dotted rectangle 700. There are only N decision states, because all decision states have the form of k consecutive C's followed by N-k consecutive D's, hence one decision state for each value of k from 0 through N-1. In all the other "non-decision" states, e.g. the state CDCDD, the policy automatically will clean the lowest-numbered dirty page, in this case, page 2, and will not terminate pre-copy. The decision states are ordered, and it is desired to move toward a state with one more clean page than before, e.g. from state 710 to state 720. After each tick during the pre-copy phase, the possible results are to advance to the next decision state; stay put, or move to a worse state. The expected cost to move from each decision state to the next can be computed using "first-step analysis", a technique from the theory of Markov chains. The more clean pages, the greater the expected cost. This converts the problem from a stochastic shortest path problem with $2^N$ possible states to a deterministic shortest path problem with N states.

Each state has an "expected cost-to-go" (CTG) which is based on the expected disruption due to waiting for unsent pages (the stochastic model makes the pessimistic assumption that if a page fault occurs, the application can not make any progress, although this is strictly true only for single-threaded applications). Thus, the more unsent pages, the greater the cost-to-go. Also, however, the more unsent pages, the greater the incremental cost-to-go relative to the state with one less unsent page, because configurations with more unsent pages have a greater or equal potential disruption cost per tick (this is only approximately true when the write and access distributions are different).

Figure 8A:
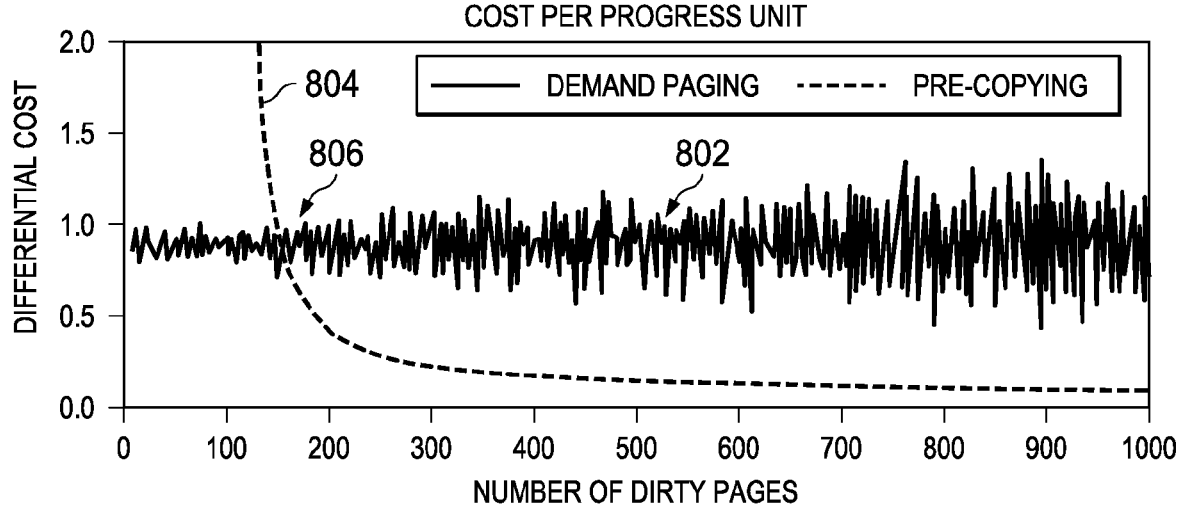
FIG. 8A is a graph that illustrates cost per progress unit for an example live migration process according to an illustrative embodiment.
Figure 8B:
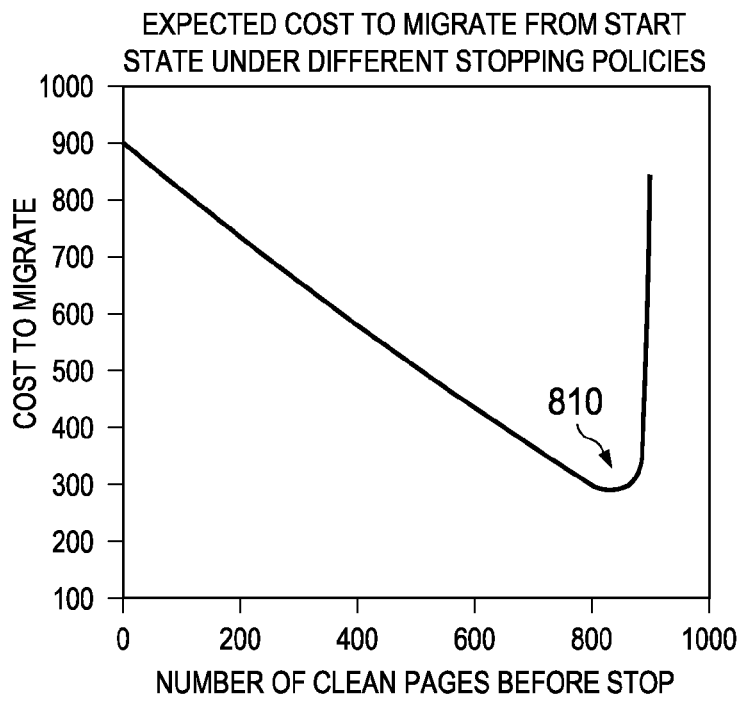
FIG. 8B is a graph that illustrates expected cost to migrate from a start state in the example of FIG. 8A.

In accordance with illustrative embodiments, the solution to the sub-problem is to stop the pre-copy phase when the incremental cost for cleaning one more page equals or exceeds the differential cost-to-go ($\Delta CTG$) for starting the demand-paging phase with one cleaner page. For example, consider an application having 1000 pages, Zipf-ditributed popularity for accesses, with an expected 16 accesses per tick and 30 percent writes. The optimum solution, given an objective function $\alpha=0.1$, $\beta=1$, is to stop after 845 clean and 155 dirty pages. FIG. 8A is a graph that illustrates cost per progress unit for an example live migration process according to an illustrative embodiment. The approximately horizontal line 802 is the differential cost for requiring one more page to be sent during demand-paging (about 0.9). The curved line 804 is the differential cost for sending one more page during pre-copy. Remember that pre-copy begins at the right of the x-axis, with all pages dirty. The relative cost to pre-copy a page starts low, at about 0.1, but moving towards the left of the graph, this cost increases, until at 155 dirty pages (845 cleaned pages) this curve 804 crosses the horizontal line 802 as shown at 806. Beyond this point, it is worse to pre-copy one more page than to stop pre-copying and let the rest of the pages be brought in by demand paging. FIG. 8B is a graph that illustrates expected total value of the objective function for different policies in this example live migration application. Notice that the minimum value is achieved under the policy of stopping after 845 cleaned pages as indicated by arrow 810.

The sub-problem solution described above is a good solution. Its cost is an upper bound on the solution to the unconstrained problem. According to an illustrative embodiment, the solution may be further improved by making certain assumptions. Specifically, it is unlikely to be a good idea to send pages early on that are likely to be written; the longer the pre-copy phase takes, the more likely it will be that early sent pages will be dirtied. Toward the end of the pre-copy phase, however, there might be an advantage to send a few higher-probability of write pages, if those pages are also high-probability of access pages. In such a case, the extra incremental cost to clean them might be outweighed by extra improvement to the cost-to-go when the demand-paging phase begins.

Based on the above assumptions, the solution to the sub-problem may be improved by skipping an "offset" number of pages in the ordering and sending higher priority pages k pages before the ideal number of pages have been cleaned. FIGS. 9A, 9B and 9C are diagrams that illustrate a method for controlling live migration of a running application according to a further illustrative embodiment. FIG. 9A illustrates a sequence of pages to be sent in an optimal solution to the constrained subproblem. In the Figure, low probability pages are on the left and high probability pages are on the right. FIG. 9B illustrates that at k=4 pages before stopping the pre-copy phase, the eight lower probability pages are skipped over in order to send higher-probability pages. This operation may result in a lower cost for the migration. In FIG. 9C, the skipping is performed multiple times which may result in a further reduction in cost. Mathematically, this is a process that searches a solution space in the neighborhood of the already-good solution to the subproblem, perturbing the parameters "k" and "offset" to find regions of the solution space that improve the previous good solution.

FIG. 10 is a flowchart that illustrates a method for controlling live migration of a running application between a source machine and a target machine according to an illustrative embodiment. The method is generally designated by reference number 1000, and begins by obtaining at least one application characteristic (Step 1002). Application characteristics may include page size, access rate of each page and write rate of each page. At least one network characteristic is also obtained (Step 1004), for example, a latency between the source machine and the target machine and a bandwidth of a connection between the source machine and the target machine. An objective function that defines a cost to migrate as a function of at least one cost property is also obtained (Step 1006). The objective function is then optimized using the at least one application characteristic and the at least one network characteristic to determine a policy when to switch execution of the running application from the source machine to the target machine (Step 1008). The policy is deployed to the source machine (Step 1010), and the source machine controls the migration of the application from the source machine by sending memory pages from the source machine to the target machine in accordance with the policy, and switching the execution of the application from the source machine to the target machine at a time specified by the policy (Step 1012).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for controlling live migration of a running application between a source machine and a target machine, comprising:
    obtaining at least one application characteristic, wherein the at least one application characteristic comprises page size, access rate of each page and write rate of each page;
    obtaining at least one network characteristic, wherein the at least one network characteristic comprises a latency between the source machine and the target machine and a bandwidth of a connection between the source machine and the target machine;
    obtaining an objective function that defines a cost to migrate from the source machine to the target machine as a function of at least one cost property;
    optimizing the objective function by using the page size and the bandwidth to compute one tick of time needed to send one page between the source machine and the target machine and specifying the access rate of each page in terms of probabilities that at least one access of each page occurs within a period of the one tick of time, to determine a policy specifying when to switch execution of the running application from the source machine to the target machine; and
    controlling live migration of the application from the source machine to send pages from the source machine to the target machine in accordance with the policy, and to switch the execution of the application from the source machine to the target machine at a state specified by the policy.

2. The method of claim 1, wherein optimizing the objective function to determine a policy, comprises:
    optimizing an expected value of the objective function to determine a policy that further specifies an order of the pages to be sent from the source machine to the target machine prior to switching the execution of the application from the source machine to the target machine, and wherein the controlling further comprises:
    sending pages to the target machine in an order specified by said policy.

3. The method of claim 1, wherein the at least one cost property comprises a total time to complete the migration, and a total application delay resulting from the target machine waiting for memory pages not yet sent by the source machine.

4. The method of claim 1, wherein optimizing the objective function comprises solving a stochastic shortest path problem from a start state representing the source machine being active and no pages sent, to a terminal state representing the target machine being active and all pages sent.

5. The method of claim 4, wherein each state of the stochastic shortest path problem models which of the source machine and the target machine is executing the application and which pages of the pages remain to be sent to the target machine, wherein a decision made in each state where the source machine is executing represents which page to send next and whether to switch the execution to the target machine, and wherein transitions of the stochastic shortest path problem represent results and costs after an execution of the one tick of time, based upon a tick length, an access rate, a write rate, and cost properties.

6. The method of claim 5, wherein optimizing the objective function further comprises:
    formulating a constrained sub-problem wherein during a pre-copying phase, pages are always sent in a rank order based on increasing probability of being written, and wherein the only decision taken is whether to switch execution from the source machine to the target machine, and wherein the decision is taken only when some consecutive set of pages in the order are sent and not overwritten;
    solving the constrained sub-problem for producing a given number of pages to pre-copy, and an upper bound on an optimal cost to migrate for the original problem; and
    searching for an improved policy by perturbing the policy, informed by the upper bound given by a solution to the constrained sub-problem.

7. The method of claim 1, and further comprising deploying the determined policy to the source machine.

8. The method of claim 1, wherein the source machine and the target machine each comprise a virtual machine running on different physical machines.

9. A system for controlling live migration of a running application between a source machine and a target machine, comprising;
a processing unit; and
a storage device storing instructions, wherein the processing unit executes the instructions to:
obtain at least one application characteristic, wherein the at least one application characteristic comprises page size, access rate of each page, and write rate of each page;
obtain at least one network characteristic, wherein the at least one network characteristic comprises a latency between the source machine and the target machine and a bandwidth of a connection between the source machine and the target machine;
obtain an objective function that defines a cost to migrate from the source machine to the target machine as a function of at least one cost property;
optimize the objective function by using the page size and the bandwidth to compute one tick of time needed to send one page between the source machine and the target machine and specifying the access rate of each page in terms of probabilities that at least one access of each page occurs within a period of the one tick of time, to determine a policy specifying when to switch execution of the running application from the source machine to the target machine; and
control live migration of the application from the source machine to send pages from the source machine to the target machine in accordance with the policy, and to switch the execution of the application from the source machine to the target machine at a state specified by the policy.

10. The system of claim 9, wherein the processing unit executes the instructions to optimize the objective function to determine a policy, comprises the processing unit executes the instructions to:
optimize an expected value of the objective function to determine a policy that further specifies an order of the pages to be sent from the source machine to the target machine prior to switching the execution of the application from the source machine to the target machine, and wherein control migration further comprises:
send pages to the target machine in an order specified by said policy.

11. The system of claim 9, wherein the at least one cost property comprises a total time to complete the migration, and a total application delay resulting from the target machine waiting for memory pages not yet sent by the source machine.

12. The system of claim 9, wherein the processing unit executes the instructions to optimize the objective function comprises the processing unit executes the instructions to solve a stochastic shortest path problem from a start state representing the source machine being active and no pages sent, to a terminal state representing the target machine being active and all pages sent.

13. The system of claim 12, wherein each state of said stochastic shortest path problem models which of the source machine and the target machine is executing the application and which pages of the pages remain to be sent to the target machine, wherein a decision made in each state where the source machine is executing represents which page to send next and whether to switch the execution to the target machine, and wherein transitions of the stochastic shortest path problem represent results and costs after an execution of the one tick of time, based upon a tick length, an access rate, a write rate, and cost properties.

14. The system of claim 13, wherein the processing unit executes the instructions to optimize the objective function further comprises the processing unit executes the instructions to:
formulate a constrained sub-problem wherein during a pre-copying phase, pages are always sent in a rank order based on increasing probability of being written, and wherein the only decision taken is whether to switch execution from the source machine to the target machine, and wherein the decision is taken only when some consecutive set of pages in the order are sent and not overwritten;
solve the constrained sub-problem for producing a given number of pages to pre-copy, and an upper bound on an optimal cost to migrate for the original problem; and
search for an improved policy by perturbing the policy, informed by the upper bound given by a solution to the constrained sub-problem.

15. The system of claim 9, wherein the source machine and the target machine each comprise a virtual machine running on different physical machines.

16. A computer program product, comprising:
a computer readable storage device having computer usable instructions embodied therein that are executable by a computer for controlling live migration of a running application between a source machine and a target machine, the computer program product comprising:
instructions for obtaining at least one application characteristic, wherein the at least one application characteristic comprises page size, access rate of each page, and write rate of each page;
instructions for obtaining at least one network characteristic, wherein the at least one network characteristic comprises a latency between the source machine and the target machine and a bandwidth of a connection between the source machine and the target machine;
instructions for obtaining an objective function that defines a cost to migrate from the source machine to the target machine as a function of at least one cost property;
instructions for optimizing the objective function by using the page size and the bandwidth to compute one tick of time needed to send one page between the source machine and the target machine and specifying the access rate of each page in terms of probabilities that at least one access of each page occurs within a period of the one tick of time, to determine a policy specifying when to switch execution of the running application from the source machine to the target machine; and
instructions for controlling live migration of the application from the source machine to send pages from the source machine to the target machine in accordance with the policy, and to switch the execution of the application from the source machine to the target machine at a state specified by the policy.

17. The computer program product of claim 16, wherein the instructions for optimizing the objective function to determine a policy, comprises:
instructions for optimizing an expected value of the objective function to determine a policy that further specifies an order of the pages to be sent from the source machine to the target machine prior to switching the execution of the application from the source machine to the target machine, and wherein the instructions configured for controlling live migration of the application further comprises:

instructions for sending pages to the target machine in an order specified by said policy.

18. The computer program product of claim 16, wherein the instructions for optimizing the objective function comprises instructions for solving a stochastic shortest path problem from a start state representing the source machine being active and no pages sent, to a terminal state representing the target machine being active and all pages sent.

19. The computer program product of claim 18, wherein each state of said stochastic shortest path problem models which of the source machine and the target machine is executing the application and which pages of the pages remain to be sent to the target machine, wherein a decision made in each state where the source machine is executing represents which page to send next and whether to switch the execution to the target machine, and wherein transitions of the stochastic shortest path problem represent results and costs after an execution of the one tick of time, based upon a tick length, an access rate, a write rate, and cost properties.

20. The computer program product of claim 19, wherein the instructions for optimizing the objective function further comprises:

instructions for formulating a constrained sub-problem wherein during a pre-copying phase, pages are always sent in a rank order based on increasing probability of being written, and wherein the only decision taken is whether to switch execution from the source machine to the target machine, and wherein the decision is taken only when some consecutive set of pages in the order are sent and not overwritten;

instructions for solving the constrained sub-problem for producing a given number of pages to pre-copy, and an upper bound on an optimal cost to migrate for the original problem; and instructions for searching for an improved policy by perturbing the policy, informed by the upper bound given by a solution to the constrained sub-problem.

* * * * *